April 14, 1970 J. L. SIMON ET AL 3,506,951

ELECTRICAL COMPONENT MOUNT

Filed Jan. 30, 1968

Inventors
JULIUS L. SIMON
EDWARD A. SALNERS
BY Mueller, Aichele, & Rauner
ATTYS.

United States Patent Office 3,506,951

Patented Apr. 14, 1970

3,506,951
ELECTRICAL COMPONENT MOUNT

Julius L. Simon, Morton Grove, and Edward A. Salners, Mount Prospect, Ill., assignors to Motorola, Inc., Franklin Park, Ill., a corporation of Illinois

Filed Jan. 30, 1968, Ser. No. 701,623
Int. Cl. H01r *9/00, 13/46*
U.S. Cl. 339—214 5 Claims

ABSTRACT OF THE DISCLOSURE

A mounting structure for electrical components, in particular disc-type thermistors, which eliminates the use of solder leads. The component is mounted between flat springs in an aperture in an insulated board. The flat springs hold the component in position and provide electrical connection therewith.

Background of the invention

In thermistor applications where a large change in resistance is required in a very short time duration, a large current to thermistor mass ratio is required. This large ratio causes substantial heat to be generated within the thermistor which in turn causes the thermistor resistance to rapidly decrease.

In applications where the resistance time change requirements are such that the amount of heat generated is close to or beyond the maximum design limits for thermistors with soldered leads, crystallization, migration of silver coating into the solder and weakening of the solder joint securing the leads to the body of the thermistor will occur. This effect will result in a permanent increase in the thermistor resistance characteristic and/or complete separation of the leads from the body of the thermistor. The use of high temperature solder for securing the leads to the thermistor body may retard crystallization for slightly longer periods of time, but will eventually also fail in such an application.

Summary of the invention

It is, therefore, an object of this invention to provide an improved mounting structure for an electrical component hwich mechanically supports the electrical component and provides electric connection thereto without the use of soldered leads.

In practicing this invention a mounting structure is provided consisting of an insulated board having an aperture extending therethrough. Flat resilient springs are secured to the board on opposite sides thereof by electrical terminals. The ends of each of the springs extends over the aperture and one spring has a projecting portion which extends into the aperture. The other spring is pivotally secured to the board by the electrical terminal securing it to the board so that it can be rotated to permit insertion of the electrical component in the aperture. A projecting portion on one end of the pivotally mounted spring acts to engage the terminal securing that spring when the spring is pivotally moved in one direction to limit the movement in that one direction. The other end of the pivotally mounted spring has a projecting portion on it to permit the application of force to rotate the flat spring.

The invention is illustrated in the drawings in which.

Description of the invention

Figure 1:
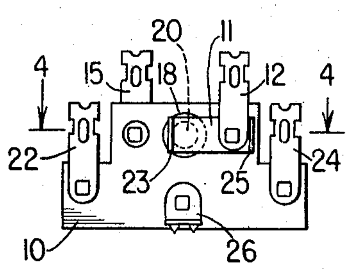
FIG. 1 is a view showing one side of the mounting structure.

Referring to FIGS. 1, 2, 3 and 4 there is shown views of the mounting structure. The mounting structure consists of an insulated board 10 having an aperture 18 therein. Aperture 18 extends through the board and is of sufficient size to permit the mounting of a component 20 therein. For purposes of illustration the component may be a disc-shaped thermistor.

A flat spring 11 is pivotally mounted on insulated board 10 by terminal 12. Terminal 12 mechanically fastens flat spring 11 to the board 10 and also provides means for making an electrical connection to flat spring 11. A second flat spring 16 is positioned on the opposite side of the board and is held in place by terminal 15. Terminal 15 provides means for mechanically fastening the flat spring 16 to the insulated board and for making an electrical connection to the flat spring 16.

Component 20 is positioned within aperture 18 between the flat springs 11 and 16. Flat spring 16 has a projecting portion 21 which projects into aperture 18 so that the resilient action of the flat springs 11 and 16 forces the springs against component 20 positioned therebetween to make electrical contact therewith. By this means electrical connections can be made to the component without the use of soldered wires.

Figure 5:
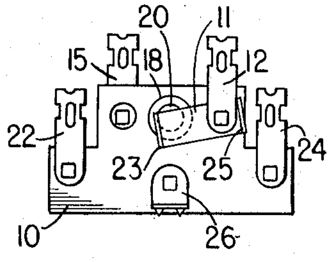
FIGS. 5 and 6 are views similar to that of FIG. 1 illustrating the operation of the pivotally mounted flat spring.
Figure 6:
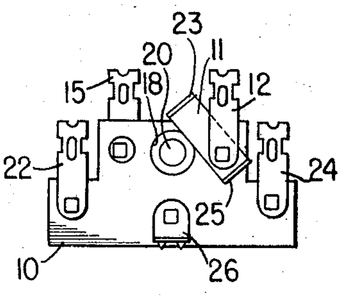
Figure 2:
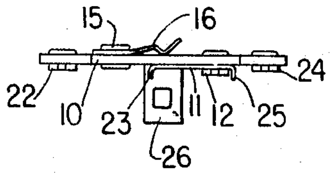
FIG. 2 is an edge view of the structure of FIG. 1.
Figure 3:
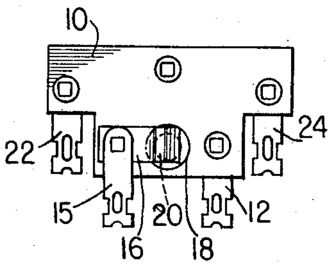
FIG. 3 is a view of the opposite side of the mounting structure.
Figure 4:
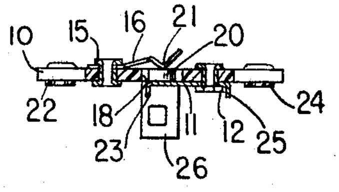
FIG. 4 is a cross-sectional view of the mounting structure.

Referring to FIGS. 5 and 6, there is shown the means by which the component may be inserted in aperture 18. Flat spring 11 has projecting portions 23 and 25 at each end. Referring to FIG. 5, projecting portion 25 bears against terminal 12 with the spring rotated as shown to limit the pivotal movement of the spring 11. This prevents spring 11 from being moved down into contact with other terminals such as terminal 26 which may also be positioned on the board. As shown in FIG. 6, spring 11 is free to rotate in the opposite dirçction so that aperture 18 is uncovered to permit removal or insertion of component 20. Projecting portion 23 provides means by which a force can be applied to cause rotation of spring 11.

Additional mounting terminals such as 22, 24 and 26 may be positioned on the board as shown to provide electrical and mechanical mounting points for other components.

Thus a simple mounting structure for an electrical component has been shown. The structure provides a secure means of mounting a component and provides electrical connections therewith without the use of soldered connections.

We claim:

1. A mounting structure for an electrical component, including in combination, a board formed of an insulating material and having an aperture extending therethrough, a first conductive spring positioned on one side of said board and having one end thereof extending over said aperture, first fastening means pivotally connecting the other end of said first spring to said board to permit pivotal movement of said first spring to uncover said aperture, a second conductive spring positioned on the other side of said board and having one end thereof extending over said aperture, second fastening means connecting the other end of said second spring to said board, said second spring further having a projecting portion extending into said aperture.

2. The mounting structure of claim 1 wherein, said first and second fastening means include first and second terminals connecting said first and second springs respectively to said board at the other end of each of said first and second springs, said first and second terminals further providing electrical connections to said first and second springs.

3. The mounting structure of claim 2 wherein, said first and second springs are flat and said first spring has a first projecting portion at said other end thereof, said first projecting portion acting to engage said first terminal to limit the pivotal movement of said first spring in one direction.

4. The mounting structure of claim 3 wherein, said first spring has a second projecting portion at said one end thereof, said second projecting portion providing means for applying force against said first spring for pivotally moving the same.

5. The mounting structure of claim 4 wherein said board has a plurality of additional terminals mounted thereon.

References Cited

UNITED STATES PATENTS

| | | | |
|---|---|---|---|
| 1,984,036 | 12/1934 | Schwartzmann | 339—198 X |
| 2,606,986 | 8/1952 | Sweger | 338—25 |
| 2,869,041 | 1/1959 | De Cola | 317—101 |
| 2,580,612 | 1/1952 | Schwarz et al. | 339—214 X |
| 3,011,379 | 12/1961 | Corwin | 84—1.19 |
| 3,022,447 | 2/1962 | Henss | 339—147 X |

RICHARD E. MOORE, Primary Examiner

U.S. Cl. X.R.

339—147, 198